April 10, 1951   O. G. KAASA   2,548,026
APPARATUS FOR PYROLYTIC CONVERSION OF HYDROCARBONS
Filed June 27, 1947
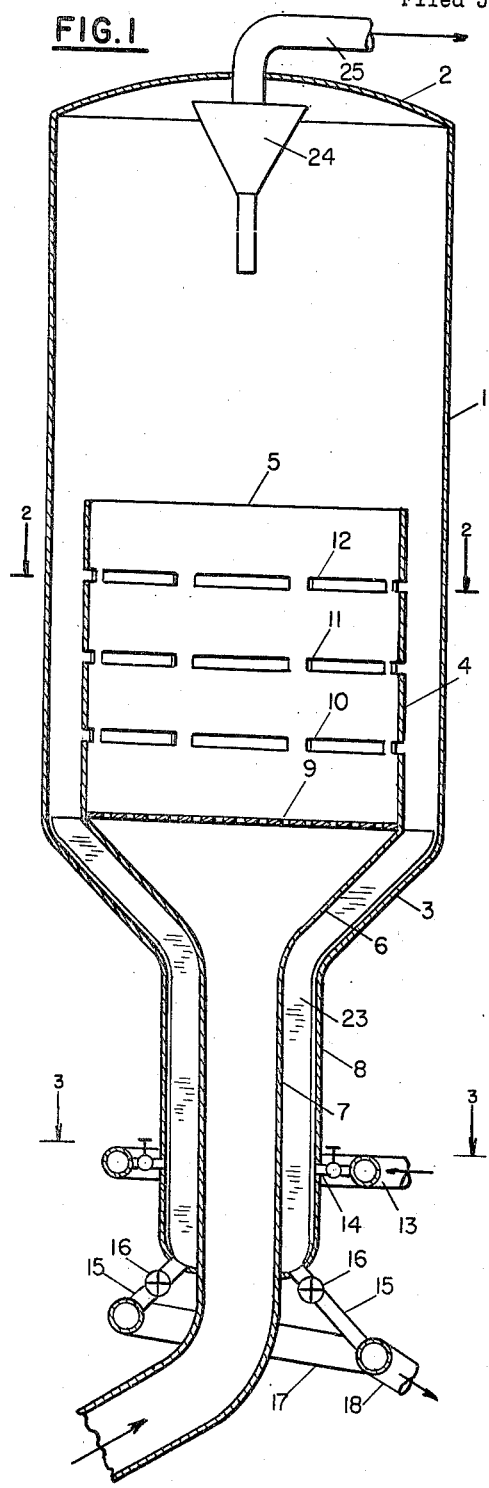
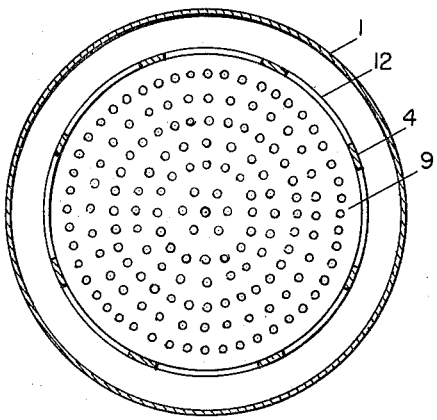
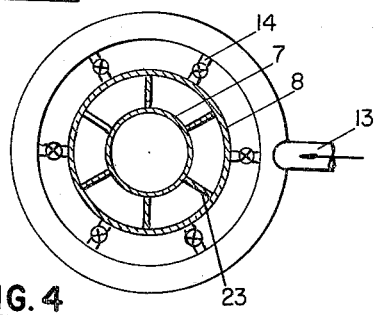
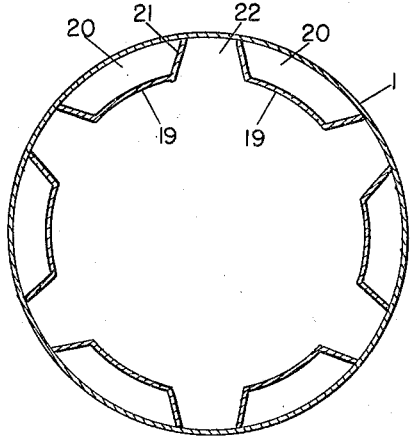
INVENTOR
ORIN GORDON KAASA
BY
Pennie, Edmonds, Morton & Barrows.
ATTORNEYS Patented Apr. 10, 1951

2,548,026

UNITED STATES PATENT OFFICE 2,548,026

APPARATUS FOR PYROLYTIC CONVERSION OF HYDROCARBONS

Orin Gordon Kaasa, East Chicago, Ind., assignor to Sinclair Refining Company, New York, N. Y., a corporation of Maine Application June 27, 1947, Serial No. 757,656

1 Claim. (Cl. 23—288)

This invention relates to the pyrolytic conversion of hydrocarbons and, more particularly, to pyrolytic conversion processes involving the use of a finely divided solid catalyst.

The invention is especially applicable to conversion processes of the general type wherein a finely divided catalyst at elevated temperature is suspended in the charge oil passing to a reactor in which conversion of the oil occurs and in which the spent catalyst is separated from the oil vapors, the separated catalyst stripped of oil, regenerated by decarbonizing the catalyst and the regenerated catalyst again suspended in the stream of charge oil passing to the reactor. Operations of the type described are commonly designated fluid catalyst processes.

In conventional fluid catalyst operations as described, the catalyst is passed to the reaction zone in suspension in the charge oil, usually in the vapor phase, and is maintained in a fluidized state in the reactor in contact with the oil vapors during the conversion of the latter.

In order to obtain the maximum yield of the desired reaction product by the use of a given proportion of the catalyst, maximum uniformity of dispersion of the catalyst in the oil vapors passing through the reactor is essential. In conventional practice, the finely divided catalyst entering the reactor is frequently not uniformly dispersed in the oil but is suspended therein in the form of agglomerates, or clusters, of the fine catalyst particles. Under such conditions, maximum and uniform contact between the hydrocarbon vapors and the catalyst is not attained in the reaction zone, with the result of lower efficiency of the desired conversion reaction. More uniform contact between the catalyst and oil vapors in the reactor is promoted if the catalyst is more uniformly dispersed in the entering charge oil.

The present invention provides improvements in conversion operations of the fluid catalyst type whereby a more thorough and more uniform contact of the catalyst with the oil vapors in the reaction zone is assured. The invention further provides improved apparatus especially adapted to the carrying out of the process.

The present invention is directed to improvements in conversion operations of the fluid catalyst type in which a wide range of space velocity may be obtained with maximum uniformity of dispersion of the catalyst in the oil vapors.

In carrying out the invention, oil vapors and hot regenerated catalyst are delivered to an inner chamber. A surrounding outer chamber forms part of the stripping section of the apparatus and is connected to the inner chamber by slots or openings in the wall separating the chambers. The position of the lowest slots determines the minimum catalyst bed height in the reaction chamber and the top of the inner annular chamber provides the maximum catalyst bed height.

The total area of the surrounding chamber may be designed to allow for a given density of catalyst bed depending on the quantity of steam used for stripping. By closing off a part of the annulus, the density of the catalyst in the stripping section, and hence the pressure drop across the outlet valve for the spent catalyst, can be varied at will. Thus the stripping section may be formed of a number of cells placed uniformly around the walls of the reactor, these cells terminating in lower similar cell sections in the portion of the stripping leg which extends below the reacting chamber. Steam is introduced into the individual cells at rates selected for stripping and for the catalyst density desired.

In the accompanying drawing I have shown several forms of apparatus suitable for use in practicing the process and forming a part of the invention. In this showing:

Fig. 1 is a vertical, sectional view of one form of the invention;

Fig. 2 is a horizontal, sectional view on line 2—2 of Fig. 1;

Fig. 3 is a similar view on line 3—3 of Fig. 1; and

Fig. 4 is a horizontal, sectional view, taken in substantially the same plane as Fig. 2 showing a modified construction.

Referring to the drawing, the reference numeral 1 designates generally a cylindrical reaction chamber closed at its upper end by a closure 2 and having a dished bottom 3. Co-axially within the chamber 1 I provide an inner chamber 4 which extends from the bottom of the chamber 1 upwardly to a point, preferably less than half the height of the main chamber and is provided with an open top 5. The bottom of chamber 4 is likewise dished as at 6 and terminates in a conduit 7. An outer casing or conduit 8 surrounds the conduit 7 and the space between the two conduits and the space between the two chambers forms a stripping section. Just above the dished bottom of the inner chamber I provide a distributing grid 9. The wall of the chamber 4 is provided with a plurality of rows of slots or openings, in this instance, illustrated as three such rows 10, 11 and 12. Steam is introduced into the stripping section from a pipe 13 having a plurality of branches 14 leading into the stripping section at various radial points. Spent catalyst in the bottom of the stripping section is discharged through outlet pipes 15 having valves 16 therein. These pipes in turn communicate with a bustle pipe 17 connected to a pipe 18 through which the spent catalyst is conveyed to regenerator.

In the form of the invention shown in Fig. 4 of the drawing, instead of forming the inner chamber cylindrical and thereby providing an annular space between it and the outer chamber extending entirely around the circumference, I may form the inner chamber of a series of arcuate sections 19 coaxial with the wall of the chamber 1 but on a smaller radius providing stripping cells 20. At the end of each of these sections 19 I may provide walls 21 extending to the outer wall and therefore including the portion 22 of what would otherwise be the outer chamber within the interior of the inner chamber and thus separating the cells 20 from each other. These cells may also extend down into the lower leg by providing partitions 23 in the lower leg. The partitions 23 are shown in Fig. 1 and may also be employed in the form of the invention shown in Fig. 1 to divide the lower leg of the stripping section into separate cells.

In operation the suspension of hot regenerated catalyst in hydrocarbon vapors is delivered through inner pipe 7 to the distributing grid 8. The grid is perforated so that the normal flow of vapor and catalyst creates a pressure drop which will be sufficient to cause good distribution of the vapors and suspended catalyst over the entire area of chamber 4. After passing through the grid, the vapor and catalyst rise in the chamber 4 and a large portion of the decomposition of the heavier oil into lighter products is accomplished in chamber 4. The catalyst circulates upwardly with the vapors and, as it tends to fall back into the dense phase of the reactor, it is forced outwardly against wall 4. Some of the catalyst is carried upwardly beyond the top 5 of the chamber 4 and falls into the annular stripping space surrounding the chamber and other portions flow through the slots 10, 11 and 12 into this space. The location of the lower row of slots 10 with respect to the grid therefore determines the minimum catalyst bed height in the reactor and the top of the chamber 4 determines the maximum catalyst bed height. Steam delivered through pipe 13 and branches 14 enters the stripping section and removes the readily vaporizable hydrocarbons from the catalyst as the catalyst gravitates downwardly through the stripping section. The treated vapors discharge through cyclone separator 24 to a discharge conduit 25 which leads to fractionators or other apparatus.

In converting hydrocarbons by the process herein disclosed, many advantages are obtained. The process eliminates the direct by-passing of catalyst from the grid to the stripper section as is possible in some designs of reactors now employed. More effective stripping is obtained by the more complete separation of the stripping zone from the reaction zone. By employing the separate stripping cells shown in Fig. 4 of the drawing the stripping area can be more easily changed to accommodate steam velocities without changing steam rates and the valves 16 for the removal of catalyst may be more readily and easily adjustable for given steam rates.

The invention contemplates the use of known methods for regenerating the catalyst and for stripping and conveying the catalyst through the system. In cracking gas oil, for instance, the reaction temperature may, with advantage, be within the range of 800 to 1000° F. and the pressure at the top of the reactor within the range of 5 to 25 pounds per square inch. The temperature of the catalyst undergoing regeneration may, with advantage, be maintained within the range of 950° to 1250° F., temperature above this range being avoided by known means.

The apparatus disclosed may also be employed to advantage as a regenerator. By feeding mixtures of air and spent catalyst through the pipe 7 and by delivering additional air, instead of steam, through the pipe 13, if desired, regeneration of the catalyst may be carried out in the chamber. The area of the annular section between the outer chamber and the inner chamber 4 may be proportioned to allow proper air rates, burning temperatures and superficial velocities in the two sections.

I claim:

Apparatus of the character described comprising a vertically elongated chamber of relatively large transverse area, a leg of substantially reduced transverse area extending downwardly from the lower end of said chamber, an inner chamber and a depending leg of reduced transverse area coaxially positioned within the first said chamber and within the leg extending downwardly therefrom, respectively, the inner chamber being in open communication at its upper end with the outer chamber and the walls of the inner chamber being perforated substantially uniformly about its periphery, the lower portion of the inner chamber being separated from the depending leg by a distributing grid, an outlet for the discharge of vapors from the upper portion of the outer chamber, an outlet for the discharge of catalyst from the lower end of the outer leg, an inlet for introduction of a fluid suspension into the lower end of the inner leg, a plurality of radially spaced, substantially vertically extending dividers in the annular space surrounding the inner leg, forming a plurality of substantially vertical passageways and an inlet adapted to the injection of a gaseous stripping medium into each of said passageways at a zone near the lower end thereof.

ORIN GORDON KAASA.

REFERENCES CITED

The following references are of record in the file of this patent:

UNITED STATES PATENTS

| Number | Name | Date |
| --- | --- | --- |
| 2,337,684 | Scheineman | Dec. 28, 1943 |
| 2,378,542 | Edmister | June 19, 1945 |
| 2,391,944 | Carlsmith | Jan. 1, 1946 |
| 2,401,739 | Johnson | June 11, 1946 |
| 2,415,755 | Ogorzaly | Feb. 11, 1947 |
| 2,436,464 | Van Dornick | Feb. 24, 1948 |
| 2,439,582 | Scheineman | Apr. 13, 1948 |

FOREIGN PATENTS

| Number | Country | Date |
| --- | --- | --- |
| 574,064 | Great Britain | Dec. 19, 1945 |